United States Patent
Schechner et al.

(10) Patent No.: US 12,305,878 B2
(45) Date of Patent: May 20, 2025

(54) SYSTEM FOR AIR CONDITIONING THE INTERIOR OF A BUILDING THAT GUIDES EXHAUST AIR INTO A FLUID RESERVOIR VIA A HEAT EXCHANGER

(71) Applicant: Envola GmbH, Ulm (DE)

(72) Inventors: Alexander Schechner, Ulm (DE); Gerhard Ihle, Ulm (DE); Islam Elhelaly, Neu-Ulm (DE)

(73) Assignee: Envola GmbH, Ulm (DE)

( * ) Notice: Subject to any disclaimer, the term of this patent is extended or adjusted under 35 U.S.C. 154(b) by 199 days.

(21) Appl. No.: 18/017,724

(22) PCT Filed: Jul. 16, 2021

(86) PCT No.: PCT/EP2021/069955
§ 371 (c)(1),
(2) Date: Jan. 24, 2023

(87) PCT Pub. No.: WO2022/017976
PCT Pub. Date: Jan. 27, 2022

(65) Prior Publication Data
US 2023/0266037 A1    Aug. 24, 2023

(30) Foreign Application Priority Data
Jul. 24, 2020  (DE) .................... 10 2020 119 653.9

(51) Int. Cl.
*F24F 12/00*   (2006.01)
*F24F 1/0038*  (2019.01)
(Continued)

(52) U.S. Cl.
CPC .......... *F24F 12/003* (2013.01); *F24F 1/0038* (2019.02); *F24F 5/0021* (2013.01);
(Continued)

(58) Field of Classification Search
CPC ...... F24F 1/0038; F24F 1/0041; F24F 5/0017; F24F 5/0021; F24F 2005/0025;
(Continued)

(56) References Cited

U.S. PATENT DOCUMENTS 2,241,060 A   5/1941  Gibson
4,281,639 A   8/1981  Kuronen
(Continued)

FOREIGN PATENT DOCUMENTS

DE  29 26 610 A1   1/1981
DE  101 06 975 A1  9/2002
(Continued)

OTHER PUBLICATIONS

International Search Report in PCT/EP2021/069956, dated Nov. 9, 2021.
(Continued)

*Primary Examiner* — Jerry-Daryl Fletcher
*Assistant Examiner* — Daniel C Comings
(74) *Attorney, Agent, or Firm* — Collard & Roe, P.C.

(57) ABSTRACT

In a system for air conditioning interior spaces of a building which are connected via at least one exhaust air duct, one or more interior spaces are provided with an air conditioner which has a inlet line of outdoor air, which supplies inlet air or circulating air to the interior space or spaces, and which is connected to a fluid circuit of a heat pump. The exhaust air duct and a further fluid circuit of the heat pump are connected to an energy store installed outside the building, wherein the energy store is connected to a heat exchanger in a liquid reservoir for energy transfer and for energy storage, which is connected via the heat exchanger to another fluid circuit of the heat pump, the exhaust air being directed into the liquid reservoir via a heat exchanger.

10 Claims, 3 Drawing Sheets

(51) Int. Cl.
*F24F 5/00* (2006.01)
*F24F 7/08* (2006.01)
*F28D 20/00* (2006.01)

(52) U.S. Cl.
CPC ............ *F24F 7/08* (2013.01); *F28D 20/0034* (2013.01); *F24F 2005/0025* (2013.01); *F24F 2221/14* (2013.01)

(58) Field of Classification Search
CPC ...... F24F 12/001; F24F 12/002; F24F 12/003; F24F 11/875
See application file for complete search history.

(56) References Cited

U.S. PATENT DOCUMENTS

| | | |
|---|---|---|
| 2018/0112930 A1 | 4/2018 | Schechner et al. |
| 2018/0356163 A1 | 12/2018 | Schechner et al. |

FOREIGN PATENT DOCUMENTS

| | | | | |
|---|---|---|---|---|
| DE | 10 2015 104 909 A1 | 9/2016 | | |
| DE | 10 2015 121 177 A1 | 6/2017 | | |
| DE | 10 2018 213 274 A1 | 2/2020 | | |
| EP | 1 785 678 A2 | 5/2007 | | |
| EP | 2 620 715 A1 | 7/2013 | | |
| FR | 3 017 934 A1 | 8/2015 | | |
| KR | 20150081090 A * | 7/2015 | ............ | F28D 20/00 |
| WO | WO-03102484 A2 * | 12/2003 | ............ | C08J 9/0009 |

OTHER PUBLICATIONS

International Search Report in PCT/EP2021/069955, mailed Oct. 27, 2021.

\* cited by examiner

SYSTEM FOR AIR CONDITIONING THE INTERIOR OF A BUILDING THAT GUIDES EXHAUST AIR INTO A FLUID RESERVOIR VIA A HEAT EXCHANGER

CROSS REFERENCE TO RELATED APPLICATIONS

This application is the National Stage of PCT/EP2021/066955 filed on Jul. 16, 2021, which claims priority under 35 U.S.C. § 119 of German Application No. 10 2020 119 653.9 filed on Jul. 24, 2020, the disclosure of which is incorporated by reference. The international application under PCT article 21(2) was not published in English.

BACKGROUND OF THE INVENTION

1. Field of the Invention

The invention relates to a system for air conditioning the interior of a building.

2. Description of the Related Art

It is known from the general state of the art to take appropriate precautions in the change of seasons to keep temperatures in indoor spaces in a temperature range that is comfortable for the users. Various systems of heating are used to increase the temperature, while air conditioners are often used to lower the temperature by feeding cooled outdoor air into the interior via a cooling compressor.

Modern systems are used as so-called ventilation and air conditioning systems, in which the outside air can be fed into the interior of the building via a heat exchanger by means of a radial fan. Exhaust air is often fed to the heat exchanger by means of an evaporative cooler, with the air drawn in by another radial fan led outside the building as extract air. In addition to various filters for cleaning the air, auxiliary heaters can also be used to enable ventilation of the interior.

An example of such a ventilation system is known from DE 10 2018 213 274 A1, which discloses an air conditioner unit with a device housing 1 with an exhaust air opening, air supply opening, exhaust air opening and outside air opening, an air supply and exhaust air fan, in recirculation mode of an outside air-exhaust air flow, and exhaust air-supply air flow in a row, and in outdoor air operation of the exhaust air-exhaust air flow, and outdoor air-supply air flow arranged one above the other cross-flow heat exchangers in the flow paths of the outside air-supply air flow, and the exhaust air-exhaust air flow arranged heat exchanger bypass flaps for transferring thermal energy between the air flows, a hybrid refrigeration system with a compressor, an evaporator, and a condenser, and a water/water-glycol refrigerant heat exchanger as an additional condenser, a reheating device, a device for adiabatic spray dampening, flaps for controlling the air flows and a device for regulating the humidity and temperature of at least part of the air flows.

Furthermore, it is known to supply outdoor air to an indoor space, whereby all indoor spaces of a building are connected via a common exhaust air duct, through which the exhaust air can be supplied to a heat pump, so that the energy contained in the exhaust air can be transferred as extract air, for example to a hot water tank, via the heat pump before leaving the building. Such exhaust air heat pumps contribute to the energy efficiency of a building.

DE 29 26 610 A1 describes a storage device for providing the input heat energy at a low temperature level for heat pump systems, which absorb this energy and release it at a higher temperature level. A water basin is designed in such a way that its water content can freeze without damaging the basin and that a heat exchanger system located at the bottom of the basin or embedded in the bottom of the basin allows the cooling and freezing heat of this basin to be fed to the cold side of a heat pump.

In addition to the use of an artificial water basin, it is also known to use natural bodies of water as a storage medium.

For example, DE 10 2015 104 909 A1 describes an energy storage system that has a heat exchanger floating on a lower basin in the form of a lake that can preferably be filled with water via a first supply line, whereby water from the lower basin can be supplied to a heat pump in separate circuits via a second supply line and coolant can be supplied to a heat pump in separate circuits via a third supply line, so that energy can be extracted via the heat exchanger with icing of the water of the lower basin or in the form of sensible heat from the water of the lower basin and can be passed on to a consumer for heat dissipation and/or cold dissipation.

Furthermore, a floating device for transferring heat energy into a body of water and for extracting heat energy from the body of water is known from DE 10 2015 121 177 A1, which has a water heat exchanger which, after the device has been placed on the body of water, immerses into the water and has an inlet and an outlet for a heat transfer fluid which can release heat energy to the body of water or extract heat energy from the body of water. The device further comprises an air heat exchanger through which ambient air can flow, and further comprises an inlet for water from the body of water and an outlet so that water from the body of water can flow through the air heat exchanger, whereby heat energy can be transferred between the ambient air flowing through the air heat exchanger and the water flowing through the air heat exchanger.

The devices described above usually work together with a heat pump installed in a building. This heat pump can, for example, be supplied with electrical energy from the power grid or its own power storage.

SUMMARY OF THE INVENTION

Against this background, the task now arises to create a system for air conditioning of indoor spaces which, compared to hitherto systems, enables year-round use, and has lower installation costs with higher energy efficiency.

This task is solved by the features of the invention. Further advantageous embodiments of the invention are discussed below. These can be combined with each other in a technologically useful manner. The description, particularly in connection with the drawing, additionally characterizes and specifies the invention.

According to the invention, a system is provided for air conditioning interior spaces of a building which are connected by at least one exhaust air duct, wherein one or more interior spaces are provided with an air conditioner which has a supply of outdoor air, which delivers supply air or recirculated air to the interior space or spaces, and which is connected to a fluid circuit of a heat pump, wherein the exhaust air duct and a further fluid circuit of the heat pump are connected to an energy storage device installed outside the building, wherein the energy storage device is designed for energy transfer and for energy storage with a heat exchanger in a liquid reservoir, which is connected via the heat exchanger to the fluid circuit of the heat pump, wherein the exhaust air is led through a heat exchanger in the liquid reservoir.

According to the invention, in the system for air conditioning of indoor spaces, the air conditioner is used for heating and cooling the outdoor air by means of the heat pump. Space heaters that are often used in regions in which heating is required can be abandoned. The exhaust air from the interior of the building is led over the energy storage unit and let out as extract air. A large part of the energy is recovered by the heat pump by the other fluid circuit. In contrast to the previously used space heating systems in combination with air conditioners, installation costs are significantly reduced. In regions where heating is required, for example, air conditioners often have no function in winter because underfloor heating is used as room heating for reasons of comfort. Known air conditioners also have a connection for the supply of fresh air, which, however, is only mixed with the supply air in a predefined ratio in connection with a recirculation mode and which often must be provided preheated as so-called primary air. Overall, the energy efficiency of the system according to the invention for air conditioning of indoor spaces is higher than that of systems known from the state of the art, since the energy-intensive air ventilation is largely abandoned.

According to one embodiment of the invention, the exhaust air, after leaving the heat exchanger in the liquid reservoir, is led as extract air to an air heat exchanger that is also connected to the heat pump. In this case, the extract air can mix with ambient air upstream of the air heat exchanger.

The concept according to the invention is extended to the effect that the exhaust air, after flowing through the heat exchanger in the liquid reservoir and leaving the system, is fed to an air heat exchanger, whereby the exhaust air can mix with ambient air before the air heat exchanger. The energy still contained in the exhaust air can now also be used by the air heat exchanger, whereby it has proven advantageous to first feed the exhaust air to a heat exchanger with a liquid reservoir and not to mix it immediately with the outdoor air, since in this way potential large temperature differences can be avoided. The combination of a first heat exchanger in the liquid reservoir and a second heat exchanger as an air heat exchanger in combination with the supply of outdoor air provides for a very efficient operation of the system according to the invention.

According to a further embodiment of the invention, the air heat exchanger is arranged above the liquid reservoir in such a way that a radial, inwardly directed air flow of exhaust air and outdoor air can be induced by the air heat exchanger by means of a fan arranged in the interior, the air flow leaving the system in a central area.

Advantageously, the air flow of extract air leaves the liquid reservoir along the outer edge of the liquid reservoir, so that a flow through the air heat exchanger then advantageously is directed radially inwards again, so that the air flow can leave the system in a central area. In this way, an air flow is made possible that follows the arrangement of the individual components without major redirections around obstacles, so that an overall simple installation of the energy storage system is possible.

According to a further embodiment of the invention, an air inlet for outdoor air is slot-shaped along the brim of a cover and an air outlet for ambient air and extract air is preferably designed centrally in the cover.

The flow of outdoor air through the air heat exchanger can be easily achieved in this way, so that a compact design of the energy storage device contributes to reducing the overall installation costs of the system for air conditioning of indoor spaces.

According to a further embodiment of the invention, the air conditioning unit is installed on a ceiling, on a wall or on a parapet wall in the interior.

Depending on the design of the interior, the cooling unit can be installed at different locations, whereby different designs of the cooling unit can also be selected, according to the use in a residential building or in an office building. In addition to the connections to the heat pump and an outside air supply, a connection to the exhaust air duct must also be created for the cooling unit.

According to a further embodiment of the invention, the air conditioner is designed as a floor-standing unit.

In this way, installation is facilitated, particularly in living spaces since technical details are no longer visible.

According to a further embodiment of the invention, when heating is required, the air conditioner heats the outdoor air before it is discharged as supply air into the interior by means of the fluid circuit of the heat pump.

The energy stored in the fluid reservoir of the energy storage can heat the outdoor air with the heat pump by means of the fluid circuit, for a pleasant indoor climate when heating is required. The discharged exhaust air is in turn fed to the energy storage such that the energy contained therein can be extracted.

According to another embodiment of the invention, when cooling is required, the air conditioner cools the outdoor air before it is discharged as supply air into the interior by means of the fluid circuit of the heat pump.

In addition to the function of space heating, the system according to the invention can also be used for air conditioning of indoor spaces.

According to a further embodiment of the invention, the air conditioner operates in recirculation mode.

If neither heating nor cooling of the room air is required, the air conditioner can operate in recirculation mode in order to exchange used room air so that it is possible to stay indoors under improved conditions.

BRIEF DESCRIPTION OF THE DRAWINGS

In the following, some embodiments are explained in more detail with reference to the figures. They show.

In the figures, identical or functionally similar components are given the same reference signs.

DETAILED DESCRIPTION OF THE PREFERRED EMBODIMENTS

Figure 1:
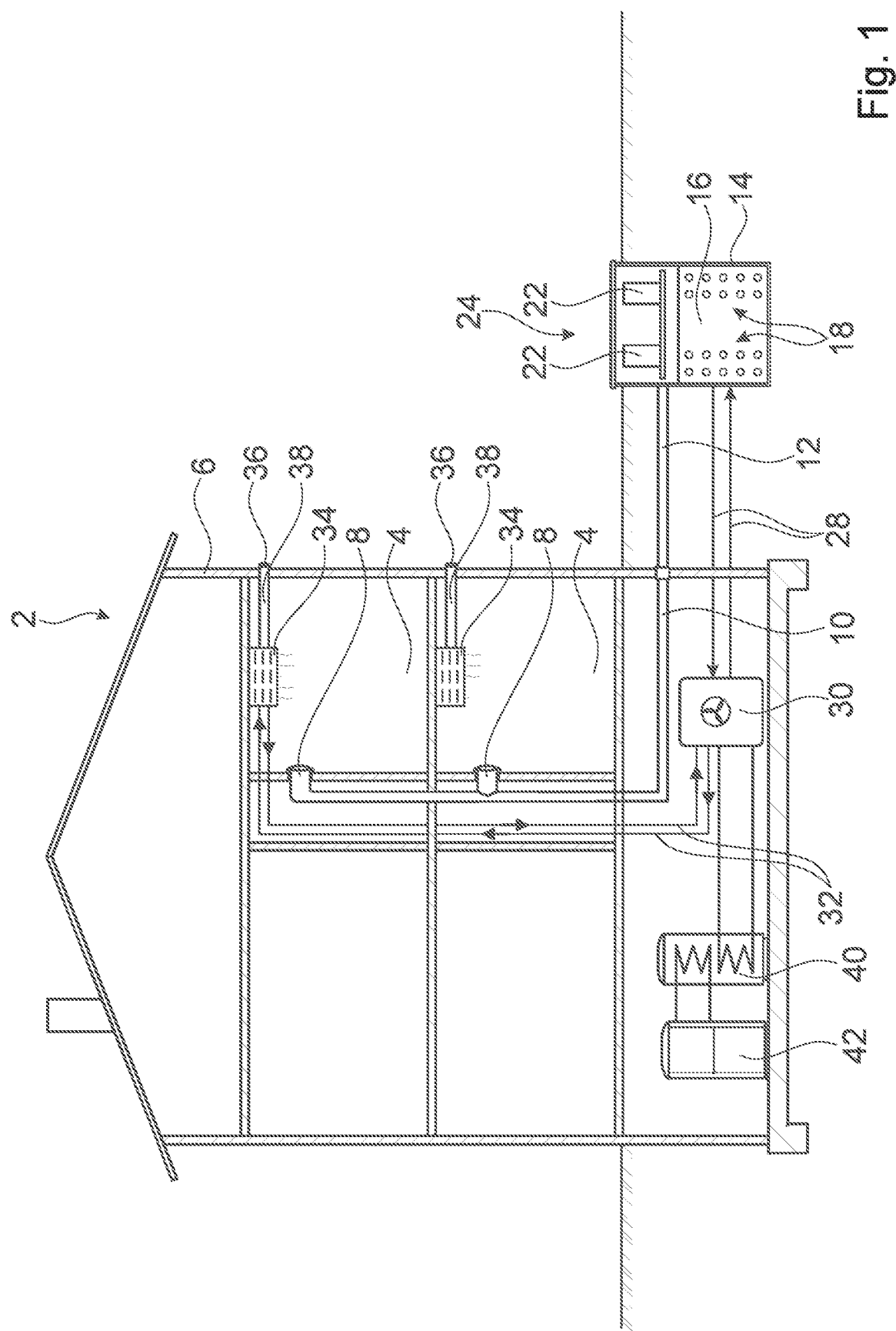
FIG. 1 shows a schematic side view of a system according to the invention.

FIG. 1 shows an embodiment of a system 2 according to the invention for air conditioning the interior spaces 4 of a building 6. The building 6 may, for example, be a residential building or an office building. However, the invention can be applied to different types of buildings, thus the example shown should not be considered definite. Each of the interior spaces 4 is connected via an exhaust air opening 8 to an exhaust air duct 10, which removes exhaust air from the interior spaces 4.

The exhaust air duct 10 is connected via a supply line 12 to an energy storage device 14, which has a liquid reservoir 16 in a lower part, in which a heat exchanger 18 is located. The energy reservoir 14 is located outside the building 6 and is typically embedded below ground level. Above the liquid reservoir 16, an air heat exchanger 22 is located above an insulation layer 20.

The air heat exchanger 22 is arranged in several segments around a central area 24 of the energy reservoir 14. The exhaust air supplied via the supply line 12 is first passed through a heat exchanger not shown in FIG. 1, which is located below the insulation layer 20 and is marked with the reference sign 26 in FIG. 2, so that the energy contained in the exhaust air is first supplied to the liquid reservoir 16.

After passing through the heat exchanger 26, the air is guided radially from the outside through the air heat exchanger 22 and leaves the system 2 in the central area 24. For the operation of the heat exchanger 18, a fluid circuit 28 is provided which connects the heat exchanger 18 with a heat pump 30 preferably arranged inside the building 6. A further fluid circuit 32 connects the heat pump 30 to an air conditioning unit 34 which, in addition to the connection to the further fluid circuit 32, has a supply of outdoor air through an opening 36 by means of the supply line 38.

Furthermore, the heat pump 30 can also be connected to other components, such as a hot water tank 40 which is connected to a heating system 42. However, these components do not form part of the invention, so that a detailed description thereof can be dispensed with.

Figure 2:
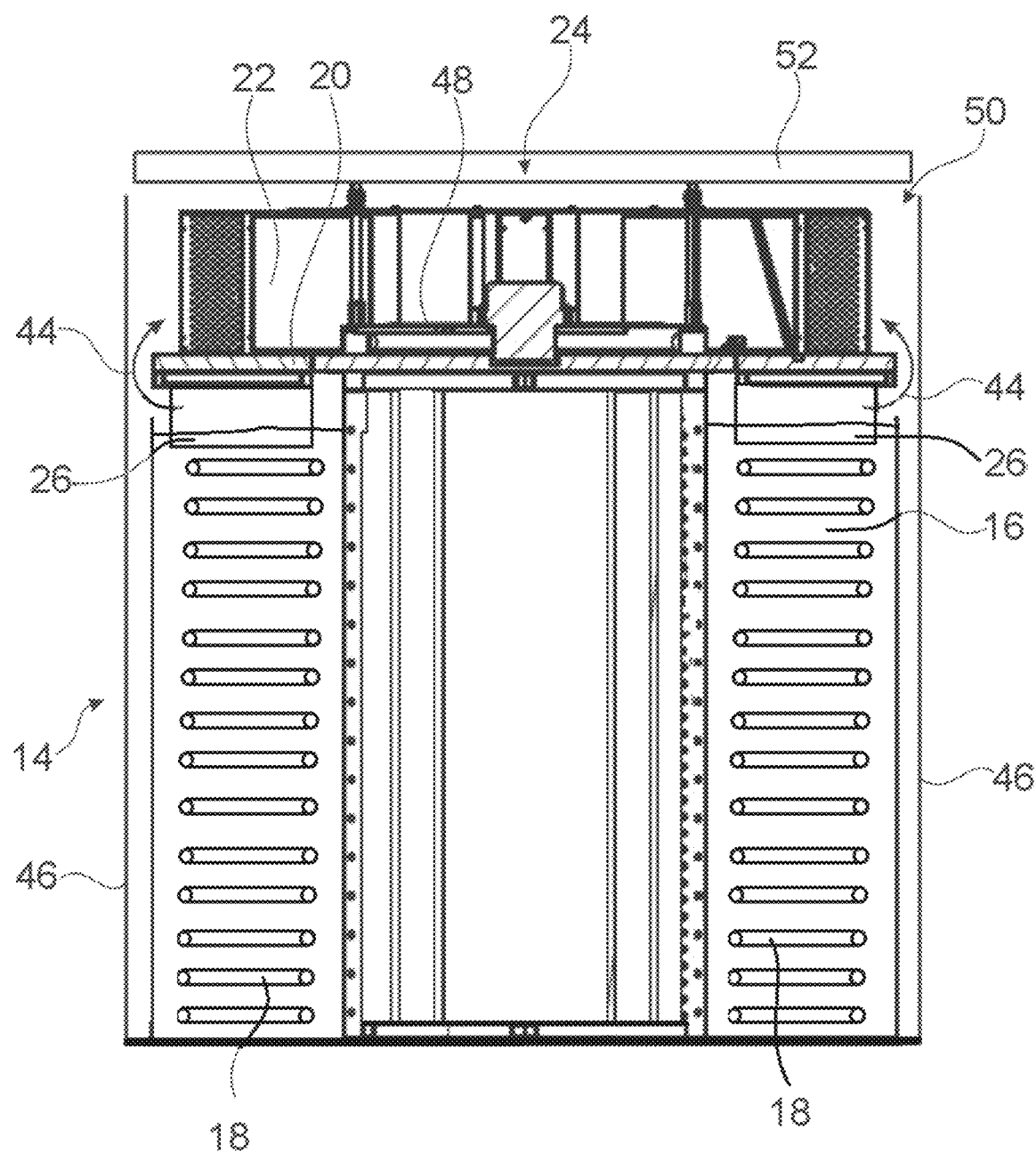
FIG. 2 shows a sectional view through an energy storage device for use in a system according to FIG. 1.

In FIG. 2, the energy storage device 14 is shown in a cross-sectional view. The energy storage device 14 has multiple pipes in the fluid reservoir 16 which are connected to the heat pump 30 via the fluid circuit 28. Typically, the fluid reservoir 16 will be filled with water or a paraffin solution. Above the fluid is the heat exchanger 26, through which the exhaust air of the building 6 flows radially outwards, so that the exhaust air leaves as extract air 44 through a slot between the insulation layer 20 and an outer shell 46. A fan 48 in the central area 24, which draws the extract air 44 together with outdoor air 50, which can flow in radially from outside between the sleeve 26 and a cover 52, in the direction of the central area 24, where the air then leaves the system 2.

The air heat exchanger 22 is above the liquid reservoir 16 above the insulation layer 20. The exhaust air supplied via the supply line 12 is first passed over the heat exchanger 26 so that the energy contained in the exhaust air is first transferred to the liquid reservoir 16. After passing through the heat exchanger 26, the air is led radially from the outside through the air heat exchanger 22 and leaves the system 2 in the central area 24. For the operation of the heat exchanger 18, in addition to the fluid circuit 28, which connects the heat exchanger 18 to a heat pump 30 preferably installed inside the building 6, a further fluid circuit not shown in the figures is provided, which connects the air heat exchanger 22 to the heat pump 30 installed inside the building 6.

Figure 3:
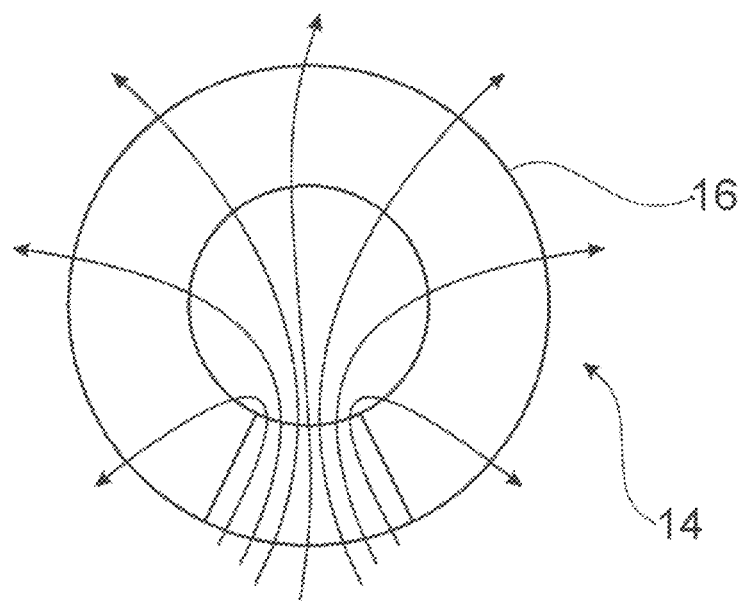
FIG. 3 shows a top view of the energy store from FIG. 2.

With reference to FIG. 3, the distribution of the exhaust air from the building 6 is shown in more detail. The exhaust air is fed to the heat exchanger 26 at one point, so that after passing through the heat exchanger 26 it leaves it radially outwards. The heat exchanger 26 can be made of metal with multiple, particularly radially aligned fins, which direct the air flow as shown in FIG. 3.

Figure 4:
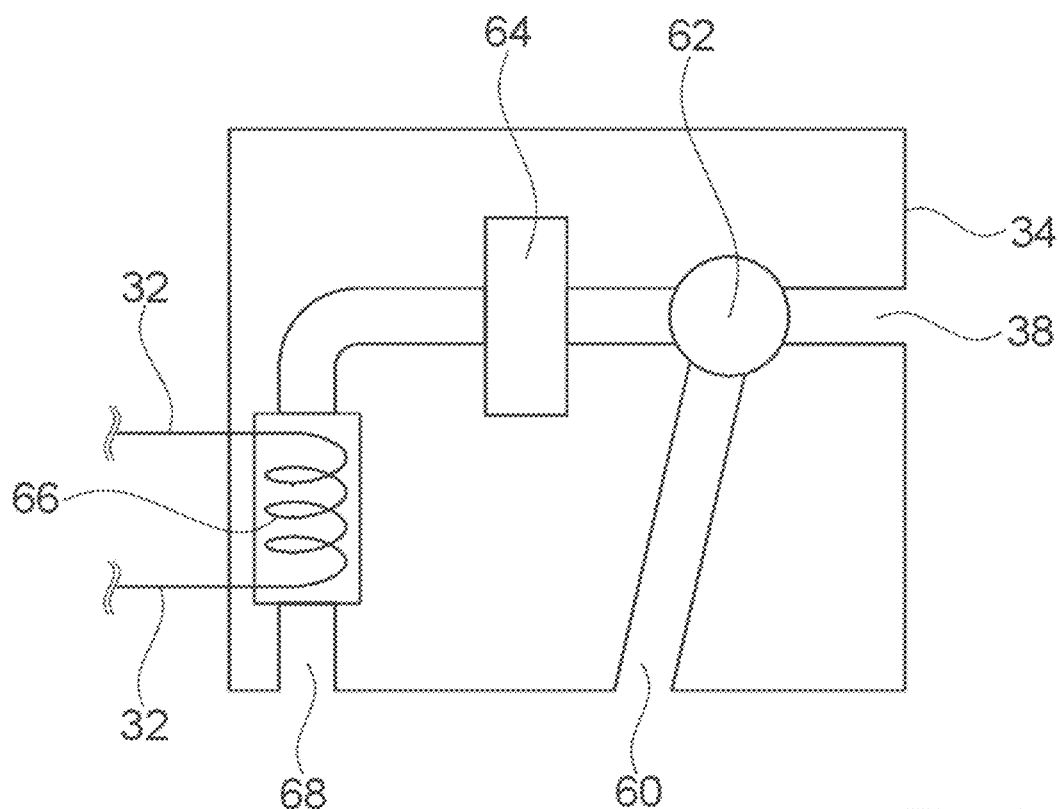
FIG. 4 shows a schematic representation of an air conditioning unit for use in a system according to FIG. 1.

With reference to FIG. 4, a schematic view of the air conditioner 34 is shown. In addition to supplying the outdoor air via the supply line 38, air can also be supplied via an inlet opening 60 and a connecting piece 62 via a fan 64 to a cooling or heating device 66 which is connected to the fluid circuit 32. Subsequently, the air thus tempered leaves the air conditioner 34 through an outlet opening 68. Additional components, such as a bypass line for bypassing the cooling or heating device 66 in recirculation mode, can of course be added within the scope of expert knowledge.

In the system 2 for air conditioning the interior spaces 4, the air conditioner 34 is used for heating and cooling the outdoor air by means of the heat pump 30. The space heaters that are often present in regions where heating is required can be abandoned. The exhaust air from the interior rooms 4 of the building 6 is led over the energy storage 14 and blown out as extract air. A large part of the energy is thereby recovered by the heat pump 30 via the fluid circuit 28.

The features as described above, and in the claims, as well as those shown in the figures, can be advantageously implemented both individually and in various combinations. The invention is not limited to the described embodiments but can be modified in various ways within the scope of skilled craftsmanship.

LIST OF REFERENCE NUMBERS 2 system
4 interior spaces
6 building
8 exhaust air opening
10 exhaust air duct
12 supply line
14 energy store
16 liquid reservoir
18 heat exchanger
20 insulation layer
22 air heat exchanger
24 central area
26 heat exchanger
28 another fluid circuit
30 heat pump
32 fluid circuit
34 air conditioning unit
36 opening
38 inlet line
40 hot water tank
42 heating system
44 extract air
46 outer shell
48 fan
50 outdoor air opening
52 cover
60 inlet opening
62 connecting piece
64 fan
66 cooling or heating device
68 outlet opening

The invention claimed is:

1. A system for air conditioning interior spaces of a building, which are connected via at least one exhaust air duct,
wherein at least one interior space is provided with an air conditioner, which has an inlet line of outdoor air, which supplies inlet air or circulating air to the at least one interior space, and which is connected to a first fluid circuit of a heat pump, wherein the exhaust air duct and a second fluid circuit of the heat pump are connected to an energy store arranged outside the building, wherein the energy store is connected to a first heat exchanger in a liquid reservoir for energy transfer and for energy storage, wherein the liquid reservoir is connected via the first heat exchanger to the second fluid circuit of the heat pump, the exhaust air being guided into the liquid reservoir via a second heat exchanger.

2. The system according to claim 1, in which the exhaust air is further exhausted from the liquid reservoir to an air heat exchanger which is also connected to the heat pump.

3. The system according to claim 2, in which the exhaust air mixes with outdoor air upstream of the air heat exchanger.

4. The system according to claim 2, in which the air heat exchanger is arranged above the liquid reservoir in such a way that a radial, inwardly-directed air flow of exhaust air and outdoor air can be induced by the air heat exchanger using a fan arranged inside the energy store, the air flow leaving the system in a central area of the energy store.

5. The system according to claim 1, in which an outdoor air opening for outdoor air is slot-shaped along the brim of a cover and an air outlet for outdoor air and exhaust air leaving the building as extract air is designed centrally on the cover.

6. The system according to claim 1, wherein the air conditioner is arranged on a ceiling, on a wall or on a parapet wall in the at least one interior space.

7. The system according to claim 1, in which the air conditioner is designed as a floor-standing unit wherein the energy store is placed directly on a floor.

8. The system according to claim 1, in which the air conditioner, when heating is required, heats the outdoor air before the outdoor air is discharged as supply air into the interior space by the first fluid circuit of the heat pump.

9. The system according to claim 1, in which the air conditioner, when cooling is required, cools the outdoor air by the first fluid circuit of the heat pump (30) before supplying the outdoor air as inlet air into the interior space.

10. The system according to claim 1, in which the air conditioner operates in recirculation mode.

* * * * *